US012638982B2

(12) United States Patent
Kunduru et al.

(10) Patent No.: US 12,638,982 B2
(45) Date of Patent: May 26, 2026

(54) TEMPERATURE-BASED READ ERROR HANDLER FOR MEMORY SYSTEM

(71) Applicant: Micron Technology, Inc., Boise, ID (US)

(72) Inventors: Srinivasa Reddy Kunduru, Singapore (SG); Lei Zhang, Singapore (SG); John Maroney, Irvine, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/988,557

(22) Filed: Dec. 19, 2024

(65) Prior Publication Data

US 2025/0208769 A1     Jun. 26, 2025

Related U.S. Application Data

(60) Provisional application No. 63/612,693, filed on Dec. 20, 2023.

(51) Int. Cl.
*G06F 3/06* (2006.01)
(52) U.S. Cl.
CPC .......... *G06F 3/0619* (2013.01); *G06F 3/0653* (2013.01); *G06F 3/0679* (2013.01)

(58) Field of Classification Search
CPC ..... G06F 3/0619; G06F 3/0653; G06F 3/0679
See application file for complete search history.

(56) References Cited

U.S. PATENT DOCUMENTS

| | | | |
|---|---|---|---|
| 11,119,697 B2 * | 9/2021 | Tai ...................... | G11C 11/5642 |
| 2016/0117216 A1 * | 4/2016 | Muchherla .............. | G06F 11/30 |
| | | | 714/6.11 |
| 2018/0046402 A1 * | 2/2018 | Vogan ................... | G06F 3/0679 |
| 2019/0012226 A1 * | 1/2019 | Muchherla .......... | G06F 11/3058 |
| 2019/0265888 A1 * | 8/2019 | Yang ................... | G11C 11/5671 |
| 2020/0135279 A1 * | 4/2020 | Singidi ................ | G11C 29/021 |
| 2023/0393936 A1 * | 12/2023 | Xotta ...................... | G11C 16/26 |
| 2024/0036973 A1 * | 2/2024 | Rayaprolu .......... | G06F 11/1048 |
| 2024/0071427 A1 * | 2/2024 | Xotta ...................... | G11C 16/26 |
| 2024/0134727 A1 * | 4/2024 | Allen .................... | G06F 11/008 |
| 2024/0202071 A1 * | 6/2024 | Xotta ................. | G06F 11/0772 |
| 2025/0053317 A1 * | 2/2025 | Kim ..................... | G06F 3/0679 |
| 2025/0342867 A1 * | 11/2025 | Xotta ..................... | G11C 16/26 |

* cited by examiner

*Primary Examiner* — Kevin Verbrugge
(74) *Attorney, Agent, or Firm* — Schwegman Lundberg & Woessner, P.A.

(57)             ABSTRACT

Various embodiments provide for temperature-based read error handling on the memory system. In particular, some embodiments enable a memory system to handle an uncorrectable error for a read operation with respect to a memory device (of the memory system) based on a cross temperature associated with the read operation.

20 Claims, 6 Drawing Sheets

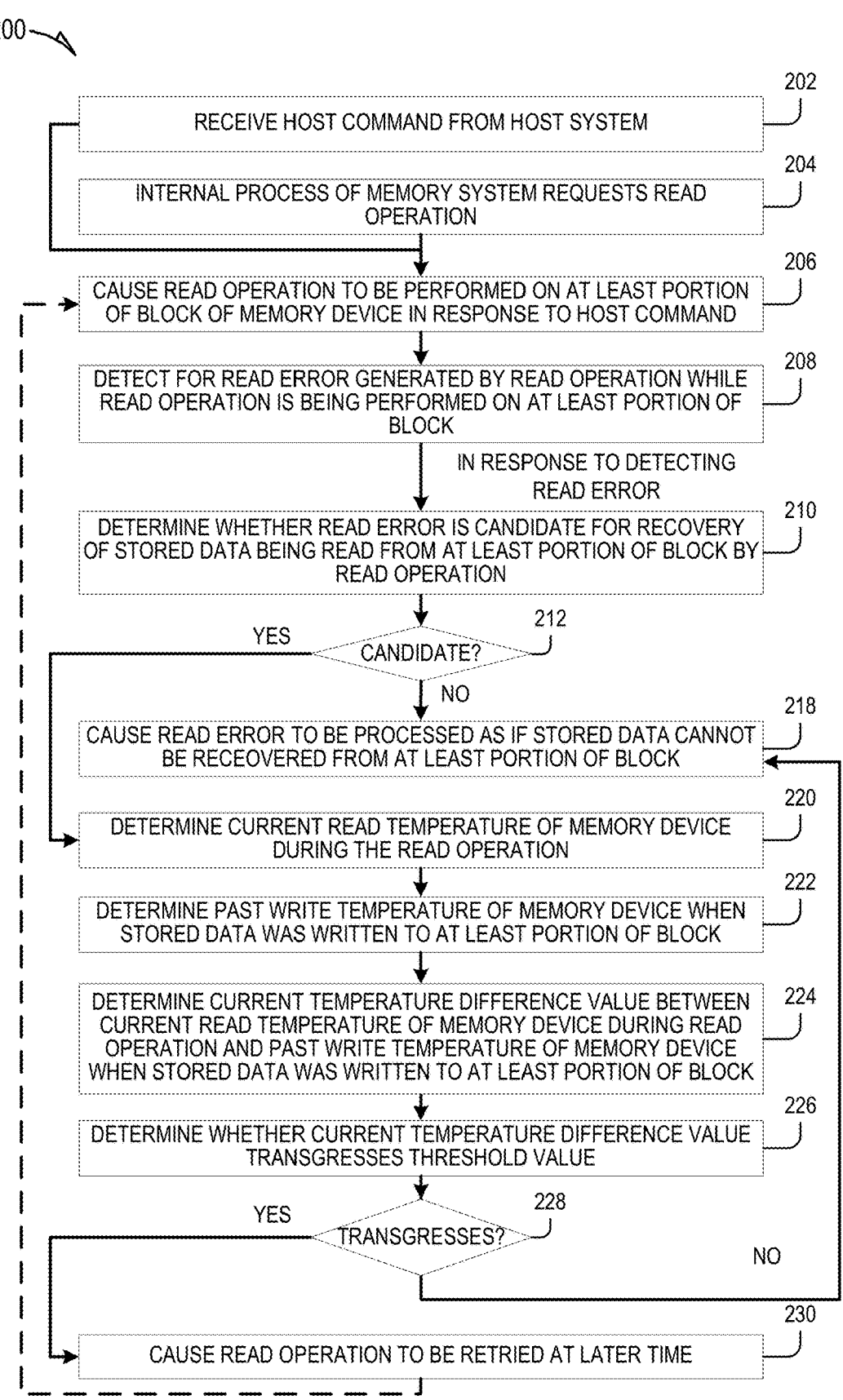

200

202
RECEIVE HOST COMMAND FROM HOST SYSTEM

204
INTERNAL PROCESS OF MEMORY SYSTEM REQUESTS READ OPERATION

206
CAUSE READ OPERATION TO BE PERFORMED ON AT LEAST PORTION OF BLOCK OF MEMORY DEVICE IN RESPONSE TO HOST COMMAND

208
DETECT FOR READ ERROR GENERATED BY READ OPERATION WHILE READ OPERATION IS BEING PERFORMED ON AT LEAST PORTION OF BLOCK

IN RESPONSE TO DETECTING READ ERROR

210
DETERMINE WHETHER READ ERROR IS CANDIDATE FOR RECOVERY OF STORED DATA BEING READ FROM AT LEAST PORTION OF BLOCK BY READ OPERATION

212
YES     CANDIDATE?
NO

218
CAUSE READ ERROR TO BE PROCESSED AS IF STORED DATA CANNOT BE RECEOVERED FROM AT LEAST PORTION OF BLOCK

220
DETERMINE CURRENT READ TEMPERATURE OF MEMORY DEVICE DURING THE READ OPERATION

222
DETERMINE PAST WRITE TEMPERATURE OF MEMORY DEVICE WHEN STORED DATA WAS WRITTEN TO AT LEAST PORTION OF BLOCK

224
DETERMINE CURRENT TEMPERATURE DIFFERENCE VALUE BETWEEN CURRENT READ TEMPERATURE OF MEMORY DEVICE DURING READ OPERATION AND PAST WRITE TEMPERATURE OF MEMORY DEVICE WHEN STORED DATA WAS WRITTEN TO AT LEAST PORTION OF BLOCK

226
DETERMINE WHETHER CURRENT TEMPERATURE DIFFERENCE VALUE TRANSGRESSES THRESHOLD VALUE

228
YES     TRANSGRESSES?
NO

230
CAUSE READ OPERATION TO BE RETRIED AT LATER TIME

302
START HOST READ

304
DETERMINE WHETHER UECC ERROR CONDITION AND OPPOSITE RISKY CONDITION SATISIFED DURING READ OPERATION OF BLOCK

306
BOTH SATISFIED?

YES

NO

308
PERFORM NORMAL UECC ERROR HANDLING

310
SEND RISKY TEMPERATURE READ ERROR TO HOST SYSTEM

312
ADD OCCURRENCE OF RISKY TEMPERATURE READ ERROR TO LOG

314
END

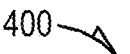

DETERMINE WHETHER UECC ERROR CONDITION AND OPPOSITE RISKY CONDITION SATISIFED DURING READ OPERATION BY INTERNAL PROCESS — 402

404 — BOTH SATISFIED?

YES

SEND RISKY TEMP ALERT TO HOST SYSTEM — 406

ADD OCCURRENCE OF RISKY TEMP ALERT TO LOG — 408

MONITOR MEMORY DEVICE TEMPERATURE BASED ON THRESHOLD TEMPERATURE VALUE — 410

DETERMINE WHETHER MEMORY DEVICE TEMPERATURE TRANSGRESSED THRESHOLD TEMPEATURE VALUE — 412

TRANSGRESSED

CANCEL RISKY TEMP ALERT — 414

END — 416

*FIG. 4*

TEMPERATURE-BASED READ ERROR HANDLER FOR MEMORY SYSTEM

PRIORITY APPLICATION

This application claims the benefit of priority to U.S. Provisional Application Ser. No. 63/612,693, filed Dec. 20, 2023, which is incorporated herein by reference in its entirety.

TECHNICAL FIELD

Example embodiments of the disclosure relate generally to memory devices and, more specifically, to temperature-based read error handling for a memory system, such as a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 2 through 5 illustrate flow diagrams of example methods for temperature-based read error handling for a memory system, in accordance with some embodiments of the present disclosure.

DETAILED DESCRIPTION

Figure 1:
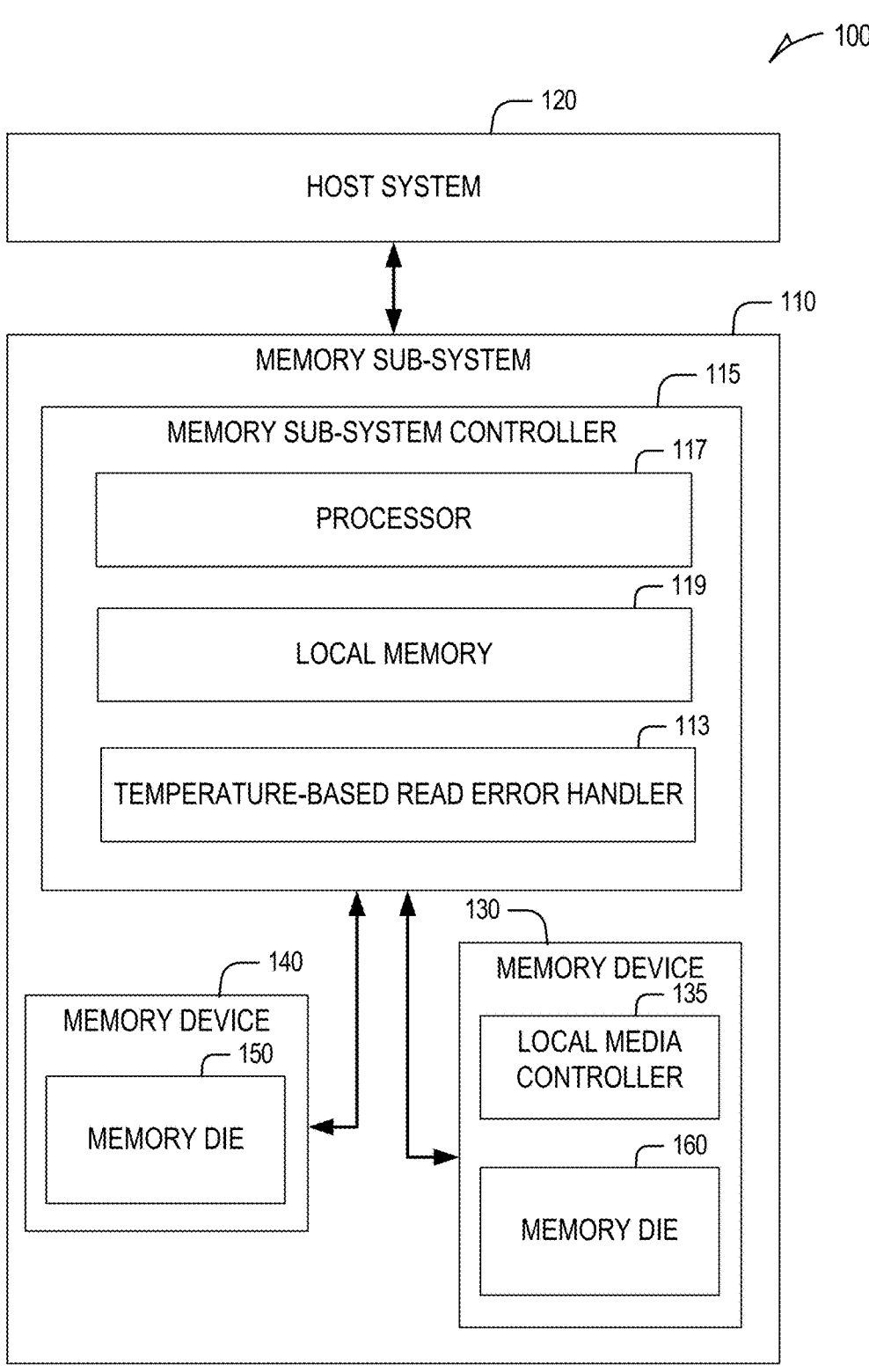
FIG. 1 is a block diagram illustrating an example computing system that includes a memory sub-system, in accordance with some embodiments of the present disclosure.

Aspects of the present disclosure are directed to temperature-based read error handling for a memory system, such as a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write commands, read commands) to the memory sub-system, such as to store data on a memory device at the memory sub-system, read data from the memory device on the memory sub-system, or write/read constructs with respect to a memory device on the memory sub-system. The data to be read or written, as specified by a host request (e.g., data access request or command request), is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version (e.g., used to distinguish age of data written), valid bitmap (which LBAs or logical transfer units contain valid data), and so forth.

The memory sub-system can initiate media management operations, such as a write operation on host data that is stored on a memory device or a scan (e.g., media scan) of one or more blocks of a memory device. For example, firmware of the memory sub-system can re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth).

A memory device can be a non-volatile memory device. A non-volatile memory device is a package of one or more die. Each die can comprise one or more planes. For some types of non-volatile memory devices (e.g., NOT-AND (NAND)-type devices), each plane comprises a set of physical blocks. For some memory devices, blocks are the smallest area that can be erased. Each block comprises a set of pages. Each page comprises a set of memory cells, which store bits of data. The memory devices can be raw memory devices (e.g., NAND), which are managed externally, for example, by an external controller. The memory devices can be managed memory devices (e.g., managed NAND), which are raw memory devices combined with a local embedded controller for memory management within the same memory device package.

Generally, writing data to such memory devices involves programming (by way of a program operation) the memory devices at the page level of a block, and erasing data from such memory devices involves erasing the memory devices at the block level (e.g., page level erasure of data is not possible). Certain memory devices, such as NAND-type memory devices, comprise one or more blocks, (e.g., multiple blocks) with each of those blocks comprising multiple pages, where each page comprises a subset of memory cells of the block, and where a single wordline of a block (which connects a group of memory cells of the block together) defines one or more pages of a block (depending on the type of memory cell). Depending on the embodiment, different blocks can comprise different types of memory cells. For instance, a block (a single-level cell (SLC) block) can comprise multiple SLCs, a block (a multi-level cell (MLC) block) can comprise multiple MLCs, a block (a triple-level cell (TLC) block) can comprise multiple TLCs, and a block (a quad-level cell (QLC) block) can comprise QLCs. Other blocks comprising other types of memory cells (e.g., higher-level memory cells) are also possible.

In conventional memory systems (e.g., memory sub-systems), each page of a block (of a memory device)

comprises a certain number of codewords, where each codeword comprises a payload portion (or payload) for storing a certain number of data sectors (or sectors) that store data (or host data) from a host system, and where each codeword comprises a non-payload portion that can include protection data (e.g., parity data, such as low-density parity-check (LDPC) data) for protecting (e.g., facilitating error correction) of all the data in the codeword. The non-payload portion can also include protection information, cyclic redundancy check (CRC) data, and metadata (e.g., security metadata and firmware metadata), and the like. For instance, the size of a sector used by a host system can be set to 512 bytes, and NAND-type memory devices can be configured with 16-kilobyte pages each comprising four 4096-byte codewords, and with each codeword comprising a payload that stores eight 512-byte sectors and comprising parity data for facilitating error correction of the host data stored in the payload.

At times, a memory controller of a memory system (e.g., a memory sub-system controller of a memory sub-system) may be unable to read stored data from (e.g., a codeword or page of) a memory device of the memory system due to one or more data errors that the memory controller cannot correct, despite the memory controller's best effort (e.g., one or more error correction attempts using ECC) or multiple retries (e.g., using different read configurations) by the memory controller. A conventional memory controller usually flags stored data that is unable to be read (after best efforts and retries) as errored and unrecoverable. For instance, when reading stored host data requested by a host system, a conventional memory controller can flag the stored host data with an uncorrectable ECC (UECC) error (also known as an unrecoverable ECC error) after the memory controller fails to correct errored data using ECC (e.g., after trying one or more other recovery/error correction techniques) and after multiple re-reads. In particular, the memory controller can send the UECC error to the host system, such as by sending the UECC error status to a response mailbox of the host system. When a processing core (or core) of a processing device of a host system sees an unrecoverable error (e.g., the UECC error), the core can invoke an appropriate error handler to handle the unrecoverable error, which can complete the error handling (e.g., UECC handling) based on type (e.g., host data read or internal data read) of the read operation that resulted in the unrecoverable error. After at least a portion of a block (e.g., a codeword or a page of the block) is determined to suffer an unrecoverable error (e.g., UECC), the conventional process causes the remaining data (e.g., host data) stored in the block to be moved (e.g., to another block) and the block to be marked as a bad block (e.g., added to a bad block list), with the marking usually being irreversible and causing the memory system to avoid usage of the block for data storage in the future.

However, conventional methods of marking a block as a bad block in response to a block (e.g., codeword or page thereof) having an UECC error can be unnecessary in certain situations. For example, in situations where a memory system is being operated in an environment having a wide operational temperature range, such as automotive applications (e.g., automotive solid-state drive (SSD)), an UECC error occurring during an extreme operating temperature may still be recoverable after the operating temperature changes (e.g., the extreme operating temperature is mitigated or no longer exists). As used herein, a cross temperature factor (or cross temperature) at the time of a read operation comprises a difference (e.g., delta) value between:

the temperature of a memory device at the time when data was written (e.g., programmed) to at least a portion of a block (e.g., a page or codeword of the block) of the memory device; and the temperature of the memory device at the time when data is read from at least the portion of the block (e.g., a page or codeword of the block) by the read operation. The temperature (of the memory device) at which data is written can be referred to herein as write temperature of the data, and the temperature (of the memory device) at which a read operation attempts to read data can be referred to herein as a read temperature of the data. Generally, the data retention of a block of a NAND-type memory device is longer (e.g., more durable) when a read operation is performed on the block (or a portion thereof) and a cross temperature factor associated with respect to the block is small (e.g., data retention is longest when the cross temperature factor is within a range). For example, where data retention of a block of a memory device is 5 years when the cross temperature for the block is within a range, the data retention of the same block can be 4 months when the cross temperature is 90 (e.g., where the write temperature is −40 C for the block and the read temperature is 50 C for the block, or where the write temperature is 130 C for the block and the read temperature is 40 C for the block). Naturally, as data retention of a block degrades, the ability to read data from the block becomes challenging, and reliance on error correction data of the block (to facilitate a read operation) increases.

As a result, in certain situations where a read operation is performed on at least a portion of a block during a large or high cross temperature (e.g., read temperature is much colder than the write temperature, or read temperature is much hotter than the write temperature), the data read from at least the portion of the block can be sufficiently errored that error correction data of at least the portion of the block is unable to be used to correct the error and a memory system can generate or issue an unrecoverable error (e.g., UECC error). However, in certain instances, such an unrecoverable error would have been avoided or not resulted if the cross temperature had been smaller or lower at the time of the read operation. Unfortunately, conventional technologies do not account for this and, as a consequence, one or more blocks can be marked (e.g., irreversibly marked) as bad blocks unnecessarily as a result of unrecoverable errors caused by larger/high cross temperatures. Overall, this can increase data loss probability and can reduce memory system robustness.

According to some embodiments, a memory system, such as a memory sub-system, implements temperature-based read error handling on the memory system. In particular, some embodiments enable a memory system to handle an uncorrectable error for a read operation with respect to a memory device (of the memory system) based on a cross temperature associated with the read operation. For some embodiments, a read operation is performed on at least a portion of a block of a memory device, such as on a codeword or a page of the block. The read operation can be initiated or performed (e.g., as a host read operation) in response to a host command/request from a host system operatively coupled to the memory system, or the read operation can be initiated or performed (e.g., as an internal read operation) as part of an internal process being performed by the memory system, such as a garbage collection process. For some embodiments, while performing a read operation on at least a portion of a block of the memory device, the memory system detects for any read errors generated by (e.g., resulting from) the read operation. If a read error is detected, the memory system can determine whether the read error is a candidate (e.g., candidate error) for recovery of the stored data being read (notwithstanding the read error). If the read error is a recovery candidate, the memory system can determine a current temperature difference value (e.g., a cross temperature) between a current read temperature at which the data is being read by the read operation, and a past write temperature when the data was written to at least the portion of the block. The memory system can then determine (e.g., check) whether the current temperature difference value (hereafter, temperature difference) transgresses (e.g., exceeds) a threshold value, where the threshold value can be a value defined by a user or a manufacturer of the memory system. If the memory system determines that the current temperature difference does transgress the threshold, the memory system can cause the read operation to be retried, such as at a later time when a temperature difference may be small or low (or smaller/lower than the current temperature difference). If the memory system determines that the current temperature difference does not transgress the threshold, the read error can be processed according to an alternative (e.g., traditional) error handling method associated with the read error (e.g., UECC error), such as causing the block to be added to a bad block list.

Various embodiments enable a memory system to recover data that may have only been deemed unreadable or unrecoverable during a read operation due to a large or high temperature difference existing at the time of the read operation. By providing another opportunity to readback/recover stored data once temperature of a memory device is in an acceptable operating range (e.g., small or low temperature difference), various embodiments enable a memory system to: avoid prematurely marking blocks as bad during read operations due to temporary temperature effects that may be causing high or large temperature differences during the read operations; and decrease data loss probability of the stored data.

As used herein, a host command can comprise a data write request or data read request received from a host system to be performed on one or more blocks or pages of a memory device in response to the request (e.g., write request or read request). The request can comprise one or more memory addresses and other parameters that specify the one or more blocks or pages on which the request is to be performed.

Disclosed herein are some examples of temperature-based read error handling for a memory system, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory devices 130, 140 when the memory sub-system 110 is coupled with the host system 120 by the PCIe or CXL interface. The physical host interface can provide an interface for passing control, address, data, and other signals between the memory sub-system 110 and the host system 120.

FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random-access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130 can include one or more arrays of memory cells. One type of memory cell, for example, SLCs, can store one bit per cell. Other types of memory cells, such as MLCs, TLCs, QLCs, and penta-level cells (PLCs), can store multiple or fractional bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks. As used herein, a block comprising SLCs can be referred to as a SLC block, a block comprising MLCs can be referred to as an MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or another suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands, requests, or operations from the host system 120 and can convert the commands, requests, or operations into instructions or appropriate commands to achieve the desired access to the memory devices 130 and/or the memory device 140. The memory sub-system controller 115 can be responsible for other operations such as wear leveling operations, garbage collection operations, error detection and ECC operations, encryption operations, caching operations, and address translations between a logical address (e.g., LBA, namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

Each of the memory devices 130, 140 include a memory die 150, 160. For some embodiments, each of the memory devices 130, 140 represents a memory device that comprises a printed circuit board, upon which its respective memory die 150, 160 is solder mounted.

The memory sub-system controller 115 includes a temperature-based read error handler 113 that enables or facilitates the memory sub-system controller 115 to temperature-based read error handling as described herein. Some or all of the temperature-based read error handler 113 is included by the local media controller 135 to facilitate the implementation of temperature-based read error handling on the memory sub-system 110 as described herein.

FIGS. 2 through 5 illustrate flow diagrams of example methods for temperature-based read error handling for a memory system, in accordance with some embodiments of the present disclosure. Any of methods 200, 300, 400, 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of methods 200, 300, 400, 500 is performed by the memory sub-system controller 115 of FIG. 1 based on the temperature-based read error handler 113. Additionally, or alternatively, for some embodiments, one or more of methods 200, 300, 400, 500 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Referring now to method 200 of FIG. 2, at operation 202, a processing device (e.g., the processor 117 of the memory sub-system controller 115) receives a host command from a host system (e.g., operatively coupled to the memory sub-system 110). According to some embodiments, the processing device generates a set of memory operations (e.g., memory media operations) based on the host command received by operation 202. After operation 202, method 200 proceeds to operation 206.

As an alternative to operation 202, at operation 204, the processing device (e.g., the processor 117 of the memory sub-system controller 115) receives or detects a read request from an internal process being performed within the memory system. For instance, the internal process can comprise a garbage collection process performed on one or more blocks of a memory device of the memory system. During a garbage collection process, a memory system controller (e.g., the memory sub-system controller 115) can reclaim one or more blocks that have been marked as no longer in use (e.g., when new data is written to a fresh block, and the old block is marked as invalid) allowing the (marked) blocks to be written to again in the future. A garbage collection can read (via one or more read operations) valid data from several blocks, consolidate (via a write operation) the read valid data into a single block, and release the several blocks to be reclaimed (e.g., to be erased and reused). A garbage collection process can assist a memory system in maintaining the performance and longevity of the memory system (e.g., of NAND-type memory devices of the memory system). After operation 204, method 200 proceeds to operation 206. At operation 206, the processing device (e.g., the processor 117) causes a read operation to be performed on at least a portion of a block of the memory device (e.g., in response to the host command received by operation 202 or in response to a read request by an internal process).

While the read operation is being performed on at least the portion of the block of the memory device, at operation 208, the processing device (e.g., the processor 117) detects for a read error generated by the read operation. At operation 210, in response to detecting the read error, the processing device determines whether the read error is a candidate for recovery (e.g., re-read) of stored data being read (by the read operation) from at least the portion of the block. Depending on the embodiment, the read error can be determined to be a candidate (for recovery of stored data being read) in response to determining that the error is an uncorrectable or an unrecoverable error. For instance, the uncorrectable/unrecoverable error can comprise a UECC error (e.g., due to failure to recover data using Error Correction Code data), a failure using another error correction technique (e.g., one using a redundant array of independent NAND-type flash memory devices (also referred to as a RAIN technique), or both. At decision point 212, if the read error is determined to be a candidate, method 200 proceeds to operation 220, otherwise method 200 proceeds to operation 218.

During operation 218, the processing device (e.g., the processor 117) causes the read error to be processed (e.g., handled) as if the stored data cannot be recovered from at least the portion of the block. For some embodiments, processing (e.g., handling) the read error as if the stored data cannot be recovered from at least the portion of the block comprises causing at least the portion of the block to be added to a bad block list. For instance, the processing device can assert a media integrity error, send a host system a UECC error response (e.g., an NVMe response), add a UECC error event to a log (e.g., a firmware event log and/or a Unified NAND event log (UNEL)), and add the block to a bad block list (e.g., a grown bad block list that lists blocks marked bad after leaving a manufacturer) to retire a block. Additionally, the addition of the block to a bad block list can be conditioned on whether there are enough valid blocks available (e.g., if yes, the block is added to the bad block list, and if not, the memory system enters a write protect mode).

At operation 220, the processing device (e.g., the processor 117) determines a current read temperature of the memory device during the read operation and, at operation 222, the processing device determines a past write temperature of the memory device when the stored data was written to at least the portion of the block (e.g., via programming of memory cells thereof). Thereafter, at operation 224, the processing device determines a current temperature difference (e.g., cross temperature) between the current read temperature (e.g., determined by operation 220) and a past write temperature (e.g., determined by operation 222). Depending on the embodiment, the current temperature difference can be determined by subtracting the current read temperature from the past write temperature, or vice versa, and can further be determined by determining an absolute value of the result of the subtraction. Then, at operation 226, the processing device determines whether the current temperature difference transgresses (e.g., exceeds or falls below, depending on the embodiment) a threshold difference value. For various embodiments, the threshold difference value represents a cross temperature limit for when a candidate read error should be retried at a later time (e.g., when the cross temperature is considered opposite risky because the current read temperature is too hot compared to the past write temperature, or the current read temperature is too cold compared to the past write temperature). Depending on the embodiment, the threshold difference value can be defined by a user or a manufacturer of the memory system (e.g., based on testing or risk tolerance), and can be defined using an algorithm. At decision point 228, if the current temperature difference transgresses (e.g., exceeds or falls below, depending on the embodiment) the threshold difference value, method 200 proceeds to operation 230, otherwise method 200 returns to operation 218.

During operation 230, the processing device (e.g., the processor 117) causes the read operation to be retried at a later time. In FIG. 2, the retry of the read operation at the later time is represented by method 200 returning to operation 206. Depending on the embodiment, the later time can comprise a later time when a current temperature of the memory device falls below the current read temperature (determined by operation 220) by a certain amount, or falls below a certain temperature threshold (e.g., determined by a user or a manufacturer of the memory system). For some embodiments, the later time comprises a later time when a future temperature difference would be at least less than the current temperature difference, or when a future temperature difference would not transgress the threshold difference value.

According to some embodiments, where the read operation is performed in response to a read request from a host system, operation 230 causes the read operation to be retried at a later time by sending an error response to the host system, where the error response indicates that the host system can retry the read request at a later time. For instance, the error response can indicate a cross temperature failure, which can be defined in accordance with an NVMe protocol. In another instance, the error response can comprise an NVMe response (e.g., vendor-specified response) sent to the host system (e.g., via an NVMe command queue). The error response can be sent to the host system by way of a sideband bus, such as a System Management Bus (SMBus) that operatively couples the host system to the memory system.

According to some embodiments, where the read operation is performed at a request of an internal process (e.g., garbage collection process), operation 230 causes the read operation to be retried at a later time by adding the read operation to a log of operations (e.g., maintained within the memory system) to be retried by the processing device. For some embodiments, causing the read operation to be retried at a later time comprises: monitoring (e.g., periodically checking) a current temperature of the memory device to determine when the current temperature transgresses a threshold temperature value (e.g., defined by a user or the manufacturer of the memory system); and in response to determining that the current temperature transgresses (e.g., falls below) the threshold temperature value, causing the read operation to be reperformed on at least the portion of the block of the memory device. The threshold temperature value can represent a temperature (e.g., a maximum or a risky operating temperature) of the memory system under which read operations on the memory system are expected to operate.

Figure 3:
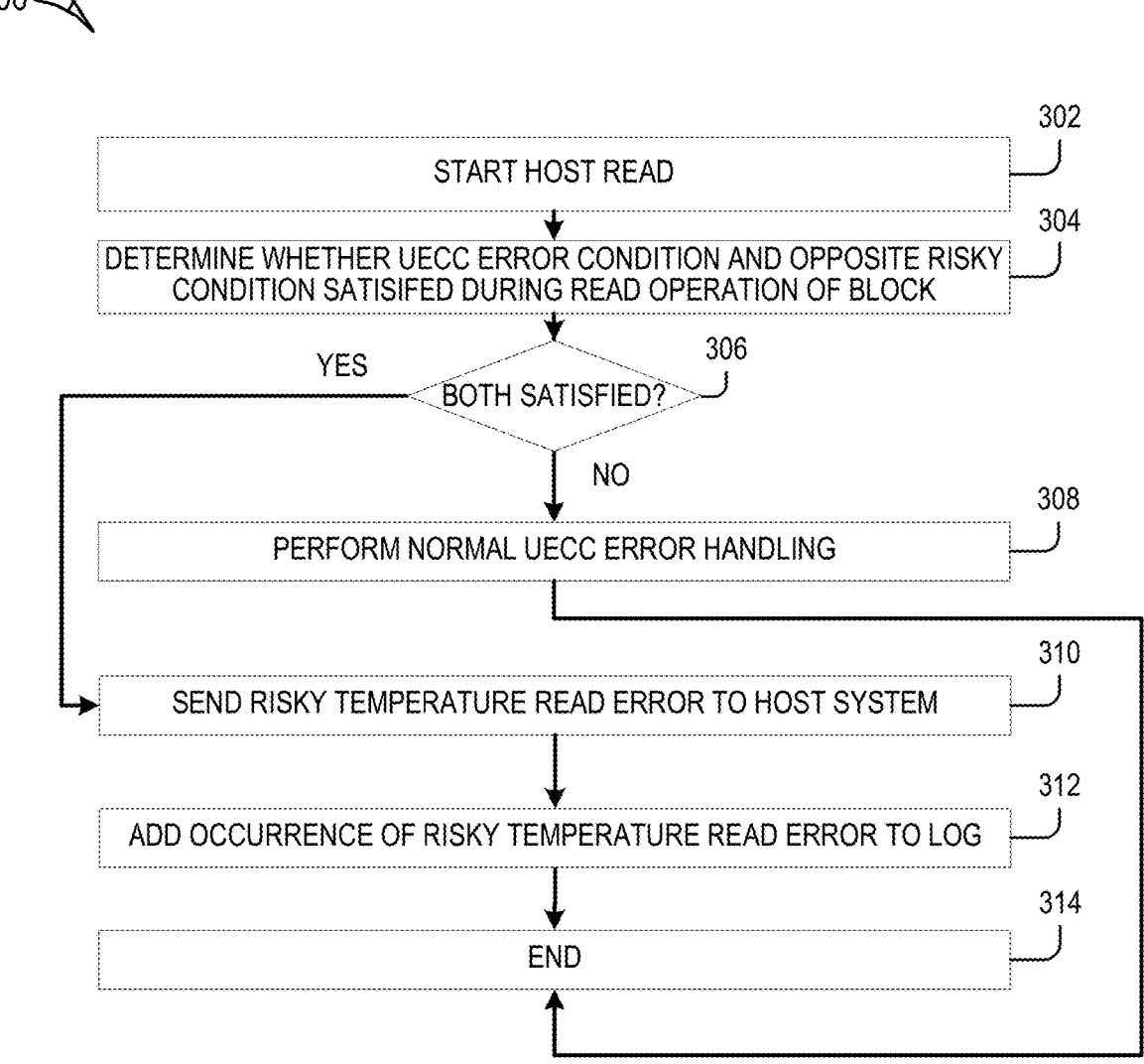

Referring now to FIG. 3, method 300 represents an example method for temperature-based error handling with respect to a read operation requested by a host system. At operation 302, a processing device (e.g., the processor 117 of the memory sub-system controller 115) starts performance of a read operation (or host read) on a block of a memory device in response to a host command from a host system. During operation 304, the processing device determines whether a UECC error condition and an opposite risky condition are satisfied during the read operation of the block. The UECC error condition can be satisfied when the UECC error condition has been generated by the read operation (e.g., the UECC error is currently present). The opposite risky condition can be satisfied if there is an extreme temperature difference (e.g., large cross temperature) between a current read temperature of the memory device during the read operation and a past write temperature of the memory device when data was stored (e.g., written) to the block. At decision point 306, if both conditions are satisfied, method 300 proceeds to operation 310, otherwise method 300 proceeds to operation 308.

At operation 308, the processing device (e.g., the processor 117) performs normal (e.g., traditional) UECC error handling to process the UECC error, and method 300 end at operation 314. During operation 310, the processing device sends a risky temperature read error (e.g., soft UECC error) to the host system and, thereafter. For various embodiments, the risky temperature read error indicates to the host system that the host system can retry the read operation of the block at a later time as described herein. The processing device adds occurrence of the risky temperature read error to a log of the memory system at operation 312, which can further facilitate the read operation being retried. After operation 312, method 300 end at operation 314.

Referring now to FIG. 4, method 400 represents an example method for temperature-based error handling with respect to a read operation requested by an internal process of a memory system. At operation 402, a processing device (e.g., the processor 117 of the memory sub-system controller 115) determines whether a UECC error condition and an opposite risky condition are satisfied during a read operation of a block of a memory device (of the memory system), where the read operation is requested by an internal process being performed by the memory system, such as a garbage collection process. The UECC error condition can be satisfied when the UECC error condition has been generated by the read operation (e.g., the UECC error is currently present). The opposite risky condition can be satisfied if there is an extreme temperature difference (e.g., large cross temperature) between a current read temperature of the memory device during the read operation and a past write temperature of the memory device when data was stored (e.g., written) to the block. At decision point 404, if both conditions are satisfied, method 400 proceeds to operation 406, otherwise method 400 proceeds to operation 416, where method 400 ends.

At operation 406, the processing device (e.g., the processor 117) sends a risky temperature read alert (e.g., soft UECC alert) to the host system, which can inform the host system of the read error event. For some embodiments, where the read operation is requested by an internal process (e.g., garbage collection), operation 406 is not performed, and a risky temperature read alert is not sent to the host system. During operation 408, the processing device adds the occurrence of the risky temperature read alert to a log of the memory system. Beginning at operation 410, the processing device monitors a temperature of the memory device based on a threshold temperature value, which permits the processing device to determine if and when the temperature of the memory device has transgressed (e.g., dropped below) the threshold temperature value at operation 412. In response to the temperature of the memory device transgressing the threshold temperature value, the processing device cancels the risky temperature alert at operation 414. After the risky temperature alert is canceled, the processing device can retry the read operation.

Figure 5:
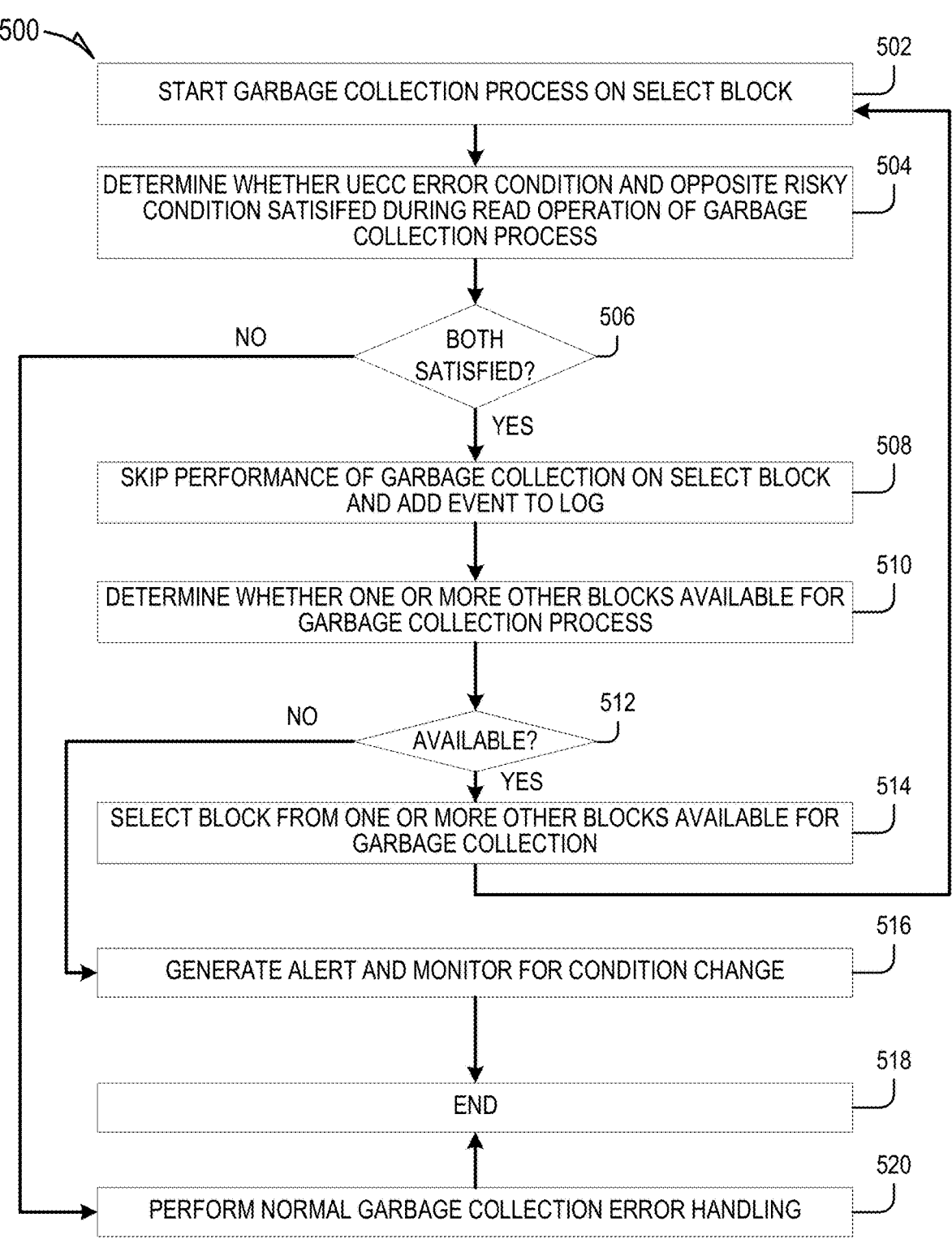

Referring now to FIG. 5, method 500 represents an example method for temperature-based error handling with respect to a read operation requested by a garbage collection process of a memory system. At operation 502, a processing device (e.g., the processor 117 of the memory sub-system controller 115) starts a garbage collection process on a select block of a memory device (of the memory system). During operation 504, the processing device determines whether a UECC error condition and an opposite risky condition are satisfied during a read operation of a block of a memory device (of the memory system), where the read operation is requested by the garbage collection process being performed by the memory system. The UECC error condition can be satisfied when the UECC error condition has been generated by the read operation (e.g., the UECC error is currently present). The opposite risky condition can be satisfied if there is an extreme temperature difference (e.g., large cross temperature) between a current read temperature of the memory device during the read operation and a past write temperature of the memory device when data was stored (e.g., written) to the block. At decision point 506, if both conditions are satisfied, method 500 proceeds to operation 508, otherwise method 500 proceeds to operation 520, where the processing device performs normal (e.g., traditional) garbage collection error handling and method 500 ends at operation 518.

During operation 508, the processing device (e.g., the processor 117) skips performance of the garbage collection process on the select block and adds the event to a log of the memory system. At operation 510, the processing device determines whether one or more other blocks of the memory device are available (e.g., marked) for garbage collection. At decision point 512, if the one or more other blocks of the memory device are available, method 500 process to operation 514, otherwise method 500 process to operation 516.

For operation 514, the processing device (e.g., the processor 117) selects a block (a select block) from the one or more other blocks that are available for garbage collection and, thereafter, method 500 returns to operation 502 to perform the garbage collection on the (new) select block. At operation 516, the processing device generates an alert and monitors for a condition (e.g., change of the opposite risky condition) in accordance with method 400 of FIG. 4. Thereafter, method 500 ends at operation 518.

Figure 6:
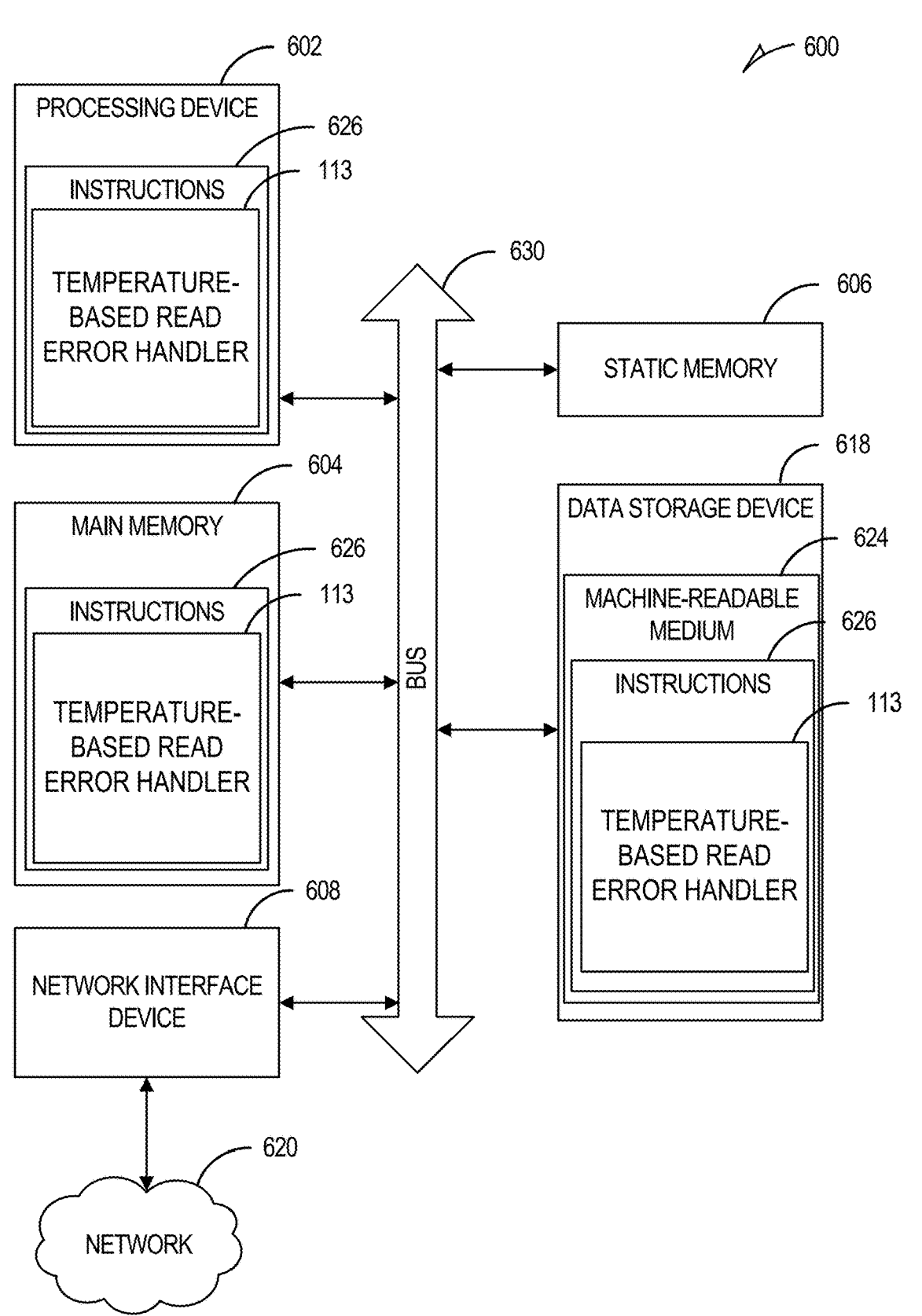
FIG. 6 is a block diagram of an example computer system in which embodiments of the present disclosure may operate.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., ROM, flash memory, DRAM such as SDRAM or Rambus DRAM (RDRAM), etc.), a static memory 606 (e.g., flash memory, static random access memory (SRAM), etc.), and a data storage device 618, which communicate with each other via a bus 630.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an application-specific integrated circuit (ASIC), a field programmable gate array (FPGA), a digital signal processor (DSP), a network processor, or the like. The processing device 602 is configured to execute instructions 626 for performing the operations and steps discussed herein. The computer system 600 can further include a network interface device 608 to communicate over a network 620.

The data storage device 618 can include a machine-readable storage medium 624 (also known as a computer-readable medium) on which is stored one or more sets of instructions 626 or software embodying any one or more of the methodologies or functions described herein. For some embodiments, the machine-readable storage medium 624 is a non-transitory machine-readable storage medium. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage device 618, and/or main memory 604 can correspond to the memory sub-system 110 of FIG. 1.

In one embodiment, the instructions 626 include instructions to implement functionality corresponding to temperature-based read error handling on a memory system as described herein (e.g., the temperature-based read error handler 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium (e.g., non-transitory machine-readable medium) having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled to the memory device, configured to perform operations comprising:
while a read operation is being performed on at least a portion of a block of the memory device, detecting for a read error generated by the read operation;
in response to detecting the read error, determining whether the read error is a candidate for recovery of stored data being read from at least the portion of the block by the read operation; and in response to determining that the read error is the candidate:
determining a current temperature difference between a current read temperature of the memory device during the read operation and a past write temperature of the memory device when the stored data was written to at least the portion of the block;
determining whether the current temperature difference transgresses a threshold difference value; and
in response to determining that the current temperature difference transgresses the threshold difference value, causing the read operation to be retried at a later time.

2. The system of claim 1, wherein the later time comprises a later time when a future temperature difference would be at least less than the current temperature difference.

3. The system of claim 1, wherein the later time comprises a later time when a future temperature difference would not transgress the threshold difference value.

4. The system of claim 1, wherein the operations comprise:
in response to determining that the current temperature difference does not transgress the threshold difference value, causing the read error to be processed as if the stored data cannot be recovered from at least the portion of the block.

5. The system of claim 4, wherein processing the read error as if the stored data cannot be recovered from at least the portion of the block comprises causing at least the portion of the block to be added to a bad block list.

6. The system of claim 1, wherein the operations comprise, prior to the determining of the current temperature difference:
determining the current read temperature of the memory device during the read operation; and
determining the past write temperature of the memory device when the stored data was written to at least the portion of the block.

7. The system of claim 1, wherein the determining of whether the read error is the candidate for recovery of stored data being read from at least the portion of the block comprises:
determining whether the read error is an uncorrectable error; and
in response to determining that the read error is an uncorrectable error, determining that the read error is the candidate for recovery of stored data being read from at least the portion of the block.

8. The system of claim 7, wherein the uncorrectable error is an uncorrectable Error Correction Code (UECC) error.

9. The system of claim 1, wherein the system is a memory sub-system, wherein the read operation is performed in response to a read request from a host system that is operatively coupled to the memory sub-system, wherein the causing of the read operation to be retried at the later time comprises sending an error response to the host system, and wherein the error response indicates that the host system can retry the read request at the later time.

10. The system of claim 9, wherein the error response is sent to the host system through a sideband bus that operatively couples the memory sub-system to the host system.

11. The system of claim 1, wherein the read operation is performed as part of an internal process being performed by the processing device, wherein the causing of the read operation to be retried at the later time comprises adding the read operation to a log of operations to be retried by the processing device.

12. The system of claim 11, wherein the internal process is a garbage collection process.

13. The system of claim 11, wherein the causing of the read operation to be retried at the later time comprises:

monitoring a current temperature of the memory device to determine when the current temperature transgresses a threshold temperature value; and in response to determining that the current temperature transgresses the threshold temperature value, causing the read operation to be reperformed on at least the portion of the block of the memory device.

14. At least one non-transitory machine-readable storage medium comprising instructions that, when executed by a processing device of a memory sub-system, cause the processing device to perform operations comprising:

while a read operation is being performed on at least a portion of a block of a memory device of the memory sub-system, detecting for a read error generated by the read operation;

in response to detecting the read error, determining whether the read error is a candidate for recovery of stored data being read from at least the portion of the block by the read operation; and in response to determining that the read error is the candidate:

determining a current temperature difference between a current read temperature of the memory device during the read operation and a past write temperature of the memory device when the stored data was written to at least the portion of the block;

determining whether the current temperature difference transgresses a threshold difference value; and in response to determining that the current temperature difference transgresses the threshold difference value, causing the read operation to be retried at a later time.

15. The at least one non-transitory machine-readable storage medium of claim 14, wherein the later time comprises a later time when a future temperature difference would be at least less than the current temperature difference.

16. The at least one non-transitory machine-readable storage medium of claim 14, wherein the later time comprises a later time when a future temperature difference would not transgress the threshold difference value.

17. The at least one non-transitory machine-readable storage medium of claim 14, wherein the operations comprise:

in response to determining that the current temperature difference does not transgress the threshold difference value, causing the read error to be processed as if the stored data cannot be recovered from at least the portion of the block.

18. The at least one non-transitory machine-readable storage medium of claim 17, wherein processing the read error as if the stored data cannot be recovered from at least the portion of the block comprises causing at least the portion of the block to be added to a bad block list.

19. The at least one non-transitory machine-readable storage medium of claim 14, wherein the operations comprise, prior to the determining of the current temperature difference:

determining the current read temperature of the memory device during the read operation; and determining the past write temperature of the memory device when the stored data was written to at least the portion of the block.

20. A method comprising:

while a read operation is being performed on at least a portion of a block of a memory device, detecting for a read error generated by the read operation;

in response to detecting the read error, determining whether the read error is a candidate for recovery of stored data being read from at least the portion of the block by the read operation; and in response to determining that the read error is the candidate:

determining a current temperature difference between a current read temperature of the memory device during the read operation and a past write temperature of the memory device when the stored data was written to at least the portion of the block;

determining whether the current temperature difference transgresses a threshold difference value; and in response to determining that the current temperature difference transgresses the threshold difference value, causing the read operation to be retried at a later time.

* * * * *